(12) United States Patent
Tanaka

(10) Patent No.: US 6,583,892 B2
(45) Date of Patent: *Jun. 24, 2003

(54) OUTPUT CONTROL APPARATUS AND OUTPUT CONTROL METHOD TO RECOGNIZE A DRAWING ABILITY OF A PRINTER

(75) Inventor: Nobuyoshi Tanaka, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/758,344

(22) Filed: Dec. 3, 1996

(65) Prior Publication Data

US 2002/0044297 A1 Apr. 18, 2002

Related U.S. Application Data

(63) Continuation of application No. 08/086,877, filed on Jul. 7, 1993, now abandoned.

(30) Foreign Application Priority Data

Jul. 9, 1992 (JP) ............................................. 4-182453

(51) Int. Cl.[7] .............................................. G06F 15/00
(52) U.S. Cl. ......................................... 358/1.9; 358/1.1
(58) Field of Search ................................ 345/334, 418, 345/440, 522; 358/467, 468, 448, 453; 382/290; 395/101, 106, 109, 112, 114, 111, 113, 117, 200.3, 200.31, 200.53, 570

(56) References Cited

U.S. PATENT DOCUMENTS

| 4,992,957 | A | * | 2/1991 | Aoyama et al. ............. 364/519 |
| 5,001,653 | A | * | 3/1991 | Buchanan et al. .......... 364/523 |
| 5,058,037 | A | * | 10/1991 | Kageyama et al. ......... 364/519 |
| 5,220,674 | A | * | 6/1993 | Morgan et al. ........ 395/200.53 |
| 5,228,118 | A | * | 7/1993 | Sasaki ........................ 395/112 |
| 5,243,691 | A | * | 9/1993 | Kuwabara et al. .......... 395/112 |
| 5,353,388 | A | * | 10/1994 | Motoyama ................... 395/112 |

FOREIGN PATENT DOCUMENTS

| JP | 63-131278 | 6/1988 |
| JP | 64-13586 | 1/1989 |
| JP | 02-193216 | 7/1990 |

* cited by examiner

Primary Examiner—Gabriel Garcia
(74) Attorney, Agent, or Firm—Fitzpatrick, Cella, Harper & Scinto

(57) ABSTRACT

In an output control apparatus and output control method for controlling a printer in accordance with its printing ability when graphics prepared by a graphics system are to be printed, the figure drawing ability of the printer and a corresponding printer driver is detected, and a figure which an application program requests to be printed is output in a form in conformity with the figure drawing ability of the printer and the printer driver. That is, when the printer and the printer driver have no requisite figure drawing ability, the figure is developed into image data, which is supplied to the printer and the printer driver.

30 Claims, 8 Drawing Sheets

OUTPUT CONTROL APPARATUS AND OUTPUT CONTROL METHOD TO RECOGNIZE A DRAWING ABILITY OF A PRINTER

This application is a continuation of application Ser. No. 08/086,877, filed Jul. 7, 1993, which is now abandoned.

BACKGROUND OF THE INVENTION

1. Field of the Invention

The present invention relates to an output control apparatus and output control method in which a desired printer is selected and an ability of a corresponding printer driver is recognized.

2. Description of the Related Art

Generally speaking, when graphics prepared by a graphics system are printed, graphics commands issued from an application program (hereinafter referred to simply as "application") are converted by a graphics engine and a printer driver into commands and data which can be printed by a printer connected to the system. The graphics engine performs conversion of logical coordinates to physical ones, conversion of the graphics commands into a form which allows processing by the printer driver, and conversion into image data of such graphics commands as cannot be drawn by the printer driver. The printer driver converts the graphics commands into image data and character data in accordance with instructions from the graphics engine, and then transmits the data to the printer after adding printer commands thereto.

The figure commands of the graphics commands from the application have conventionally been processed, for example, by one of the following methods:

(1) The graphics engine recognizes the figure drawing ability of the printer driver, decomposes the figure commands into figures which can be drawn by the printer driver, and then calls the printer driver (for example, where the application has issued a circle drawing command when the printer driver has no figure drawing ability, the graphics engine decomposes the circle into an aggregation of dots, and then repeatedly requests the printer driver to perform dot drawing).

(2) The graphics engine unconditionally converts the figure commands into image data and transfers it to the printer driver.

A problem with method (1) is that all figures are replaced by the aggregation of dots when the printer driver has no figure drawing ability, which means the graphics engine has to call the printer driver a number of times corresponding to the number of dots, resulting in the system performing rather poorly.

Method (2) has a problem in that even when the printer driver or the printer has a figure drawing ability, it has to remain unused, which also causes the system to perform poorly.

SUMMARY OF THE INVENTION

It is an object of the present invention to provide an output control method according to which the graphics engine takes into account the figure drawing ability of the printer driver as recognized by a printer-driver-figure-drawing-ability detecting means; when it is determined that the printer driver has no figure drawing ability, figure commands are converted into image data by the graphics engine and then transferred to the printer driver; and when it is determined that the printer driver has a figure drawing ability, the graphics engine decomposes figure commands into a figure which can be drawn by the printer driver and then transfers it to the printer driver.

Further, it is an object of the present invention to provide an output control apparatus and output control method in which a desired printer is selected and in which to perform printing through a printer driver corresponding to this printer, the drawing ability of this printer driver is recognized so that it can be determined whether to convert a figure designated by graphics commands into image data or not in accordance with the recognition result.

DETAILED DESCRIPTION OF THE PREFERRED EMBODIMENTS (First Embodiment)

A first embodiment of the present invention will be now described with reference to the drawings. The first embodiment consists of a system constructed under the following conditions:

[Figure Drawing Ability of the Printer Driver]

The "figure drawing ability of a printer driver" means either a figure drawing function a printer itself possesses or a figure drawing function not possessed by the printer but realized by the printer driver. The latter function is utilized when the printer has no ability to draw figures; in that case, the printer driver receives, for example, linear drawing commands and converts them into image data, then transmits the data to the printer.

The printer has font data stored in a memory means such as a ROM, from which it reads font data on the basis of text data supplied from the outside and prints the same.

Further, the printer is capable of receiving image data supplied from the outside and printing it.

[Application Commands (Commands Which Can Be Issued from an Application and Supplied to a Graphics Engine)]

The following six categories of commands are used as application commands:

A-command for dot drawing

A-command for circle drawing

A-command for rectangle drawing

A-command for linear drawing

A-command for text output

A-command for image output

[Printer Driver Commands (Commands Which Can Be Issued from the Graphics Engine to the Printer Driver)]

The following seven categories of commands are used as printer driver commands:

P-command for dot drawing
P-command for circle drawing
P-command for rectangle drawing
P-command for linear drawing
P-command for text output
P-command for image output
P-command for an inquiry about figure drawing ability Of these, the P-command for dot drawing, the P-command for image output and the P-command for inquiry about figure drawing ability are provided in every printer driver. The P-command for circle drawing, the P-command for rectangle drawing and the P-command for linear drawing are provided in some printer drivers.

The A and P-commands are not restricted to the above-mentioned ones.

[Graphics Engine]

In the case of a figure which cannot be drawn with the figure drawing ability of the printer driver, the graphics engine does not issue any corresponding printer driver commands.

When the figure drawing ability of the printer driver is at a level lower than a linear drawing ability, the graphics engine converts any figure into an image, and transfers the image to the printer driver as image data.

(Explanation of the Drawings)

Figure 1:
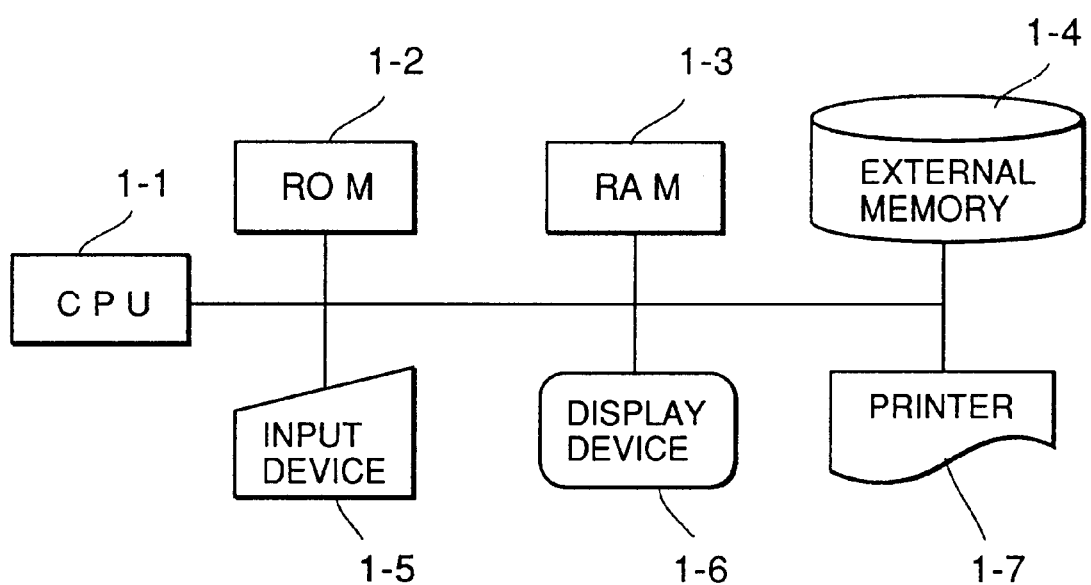
FIG. 1 is a block diagram showing the system configuration of the present invention.

[FIG. 1: System Block Diagram]

FIG. 1 is a block diagram showing the system configuration of the first embodiment of the present invention. A CPU 1-1 controls each part of the system, executing all sorts of calculations, judgments and processings. Numerals 1-2 and 1-3 indicate memories consisting of a ROM and RAM, respectively. Program areas of these memories store the means (the application and the graphics engine) constituting the graphics system shown in the functional block diagram of FIG. 2. Each means includes control procedures corresponding to the flowcharts of FIGS. 4, 5 and 6, which procedures are executed by the CPU 1-1. An external memory 1-4 stores various programs and data. An input device 1-5 and a display device 1-6 serve as a principal communication means between this graphics system and an operator. The input device 1-5 can be connected to a pointing device. The operator enters all sorts of information at the input device 1-5, and the display device 1-6 displays information supplied from the system to the operator. A printer 1-7 prints characters, figures, images, etc. upon a request from the operator. The printer 1-7 may consist of a plurality of printers which can be collectively or selectively connected.

Figure 2:
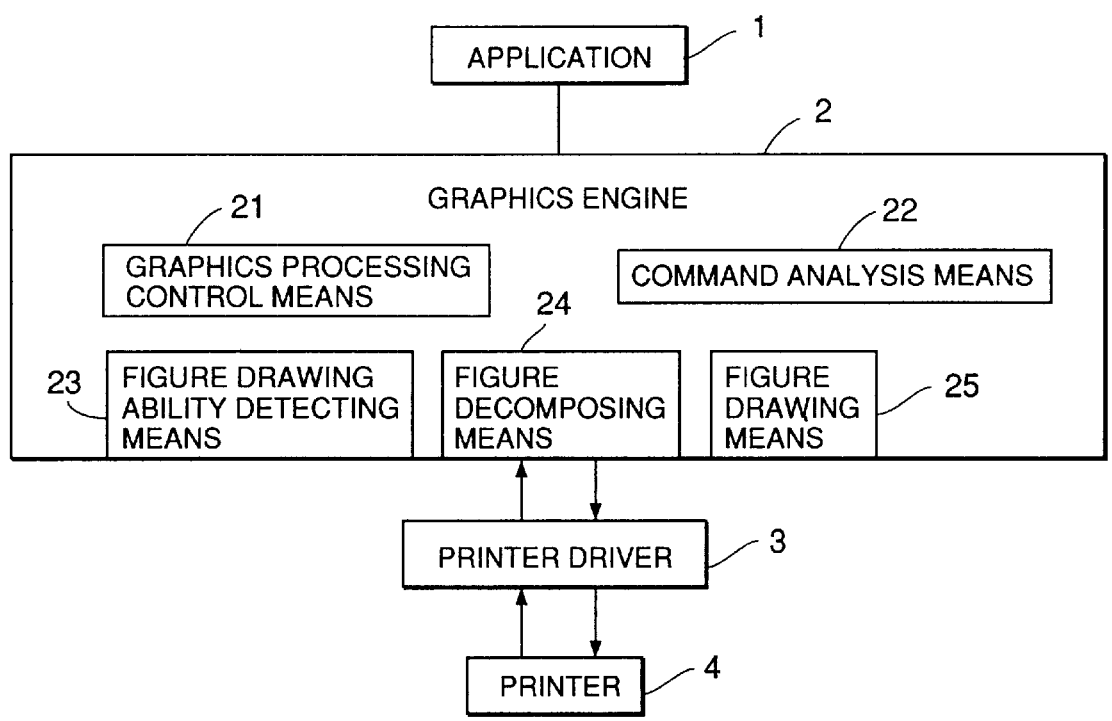
FIG. 2 is a functional block diagram showing the construction of the present invention.

[FIG. 2 Functional Block Diagram]

FIG. 2 is a block diagram showing the functional construction of the present invention. An application 1 issues application commands for a graphics engine 2, requesting the graphics engine to output characters, figures or images to a printer. A graphics processing control means 21 of the graphics engine 2 analyzes an application command from the application 1 by using a command analysis means 22. When the application command is an A-command for text output, the graphics processing control means 21 converts this command into a P-command for text output to be supplied to the printer. When the application command is an A-command for image output, the control means 21 converts it into a P-command for image output to be supplied to the printer. When the application command is a figure-drawing-request command, the control means 21 converts this command into an appropriate printer driver command by referring to the figure drawing ability of the printer driver as detected by a figure drawing ability detecting means 23 and decomposing, as needed, the command by using a figure decomposing means 24. If the figure drawing ability of the printer driver only consists of dot drawing, the control means 21 changes the figure command to image data by using a figure drawing means 25 of the graphics engine, and converts the data into a P-command for image output, and then calls the printer driver.

A printer driver 3 converts the printer driver command from the graphics engine 2 into a printer command and supplies this command to a printer 4. The printer driver may be on the host side of a personal computer, etc., or on the printer side.

[FIG. 3]

Figure 3:
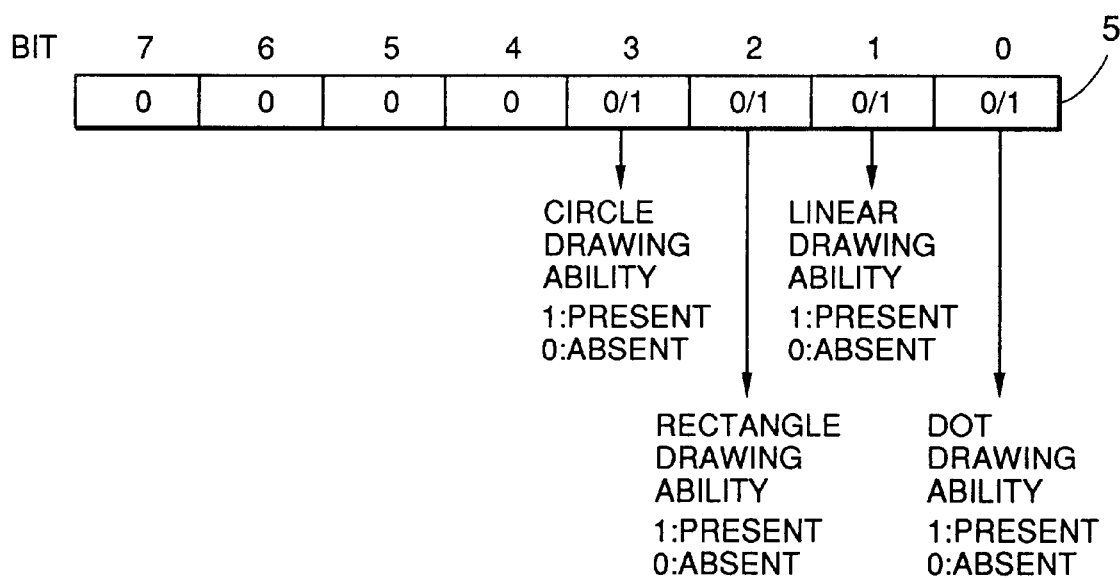
FIG. 3 is a conceptual diagram showing a figure-drawing-ability flag.

FIG. 3 illustrates a figure-drawing-ability flag 5. The printer driver sets the bit number of this flag which corresponds to the printer driver's figure drawing ability to 1 ("1" indicates the presence of a corresponding ability) and transfers the flag to the graphics engine. Due to this flag, the graphics engine can recognize the figure drawing ability of any printer driver. Such information on the drawing ability can be obtained by data transfer through a two-way interface, or the information may be stored in the RAM 1-3 and the external memory 1-4 of FIG. 1, making it possible to comprehend the ability of a corresponding printer driver in accordance with the desired printer selected.

Figure 4:
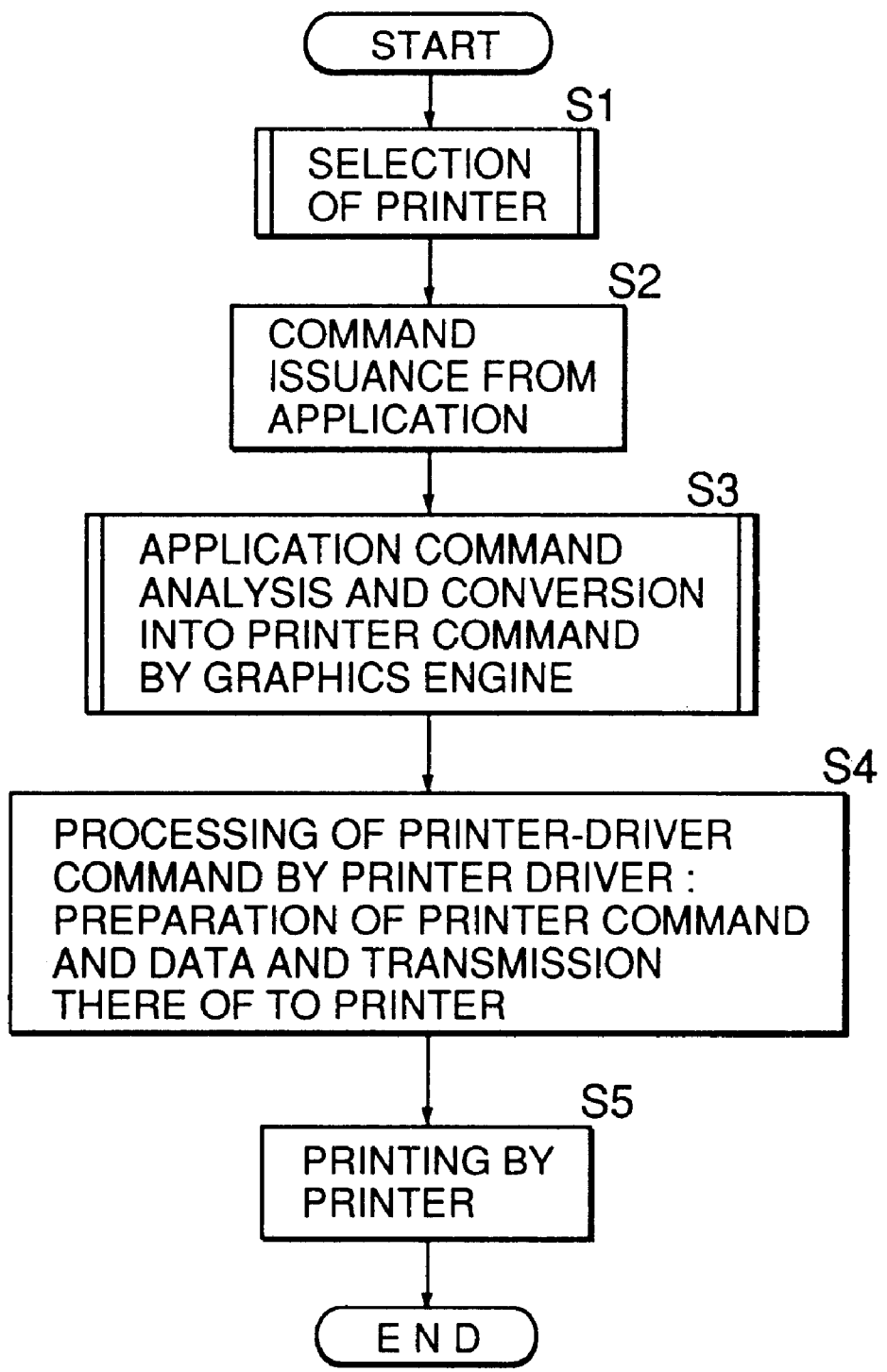
FIG. 4 is a flowchart showing printing procedures.
Figure 5:
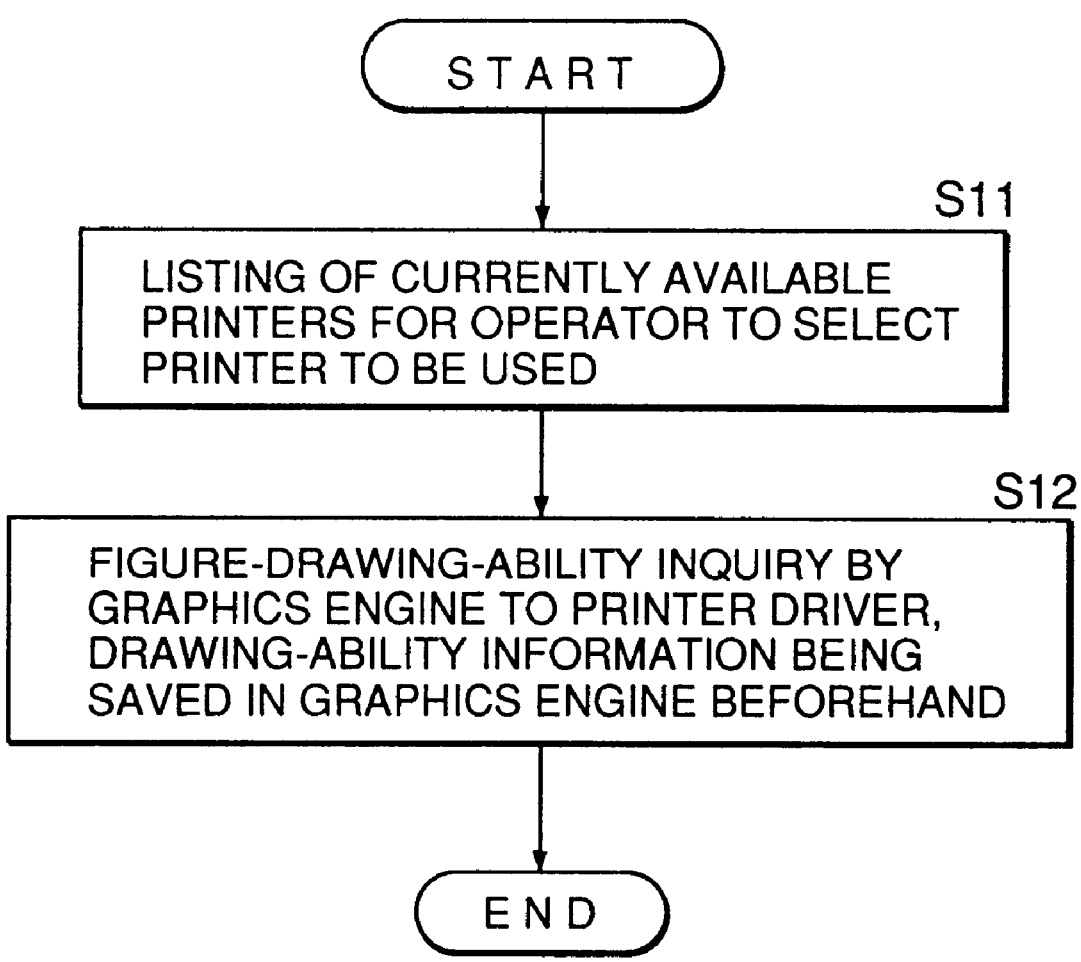
FIG. 5 is a flowchart showing printer selection procedures.
Figure 6:
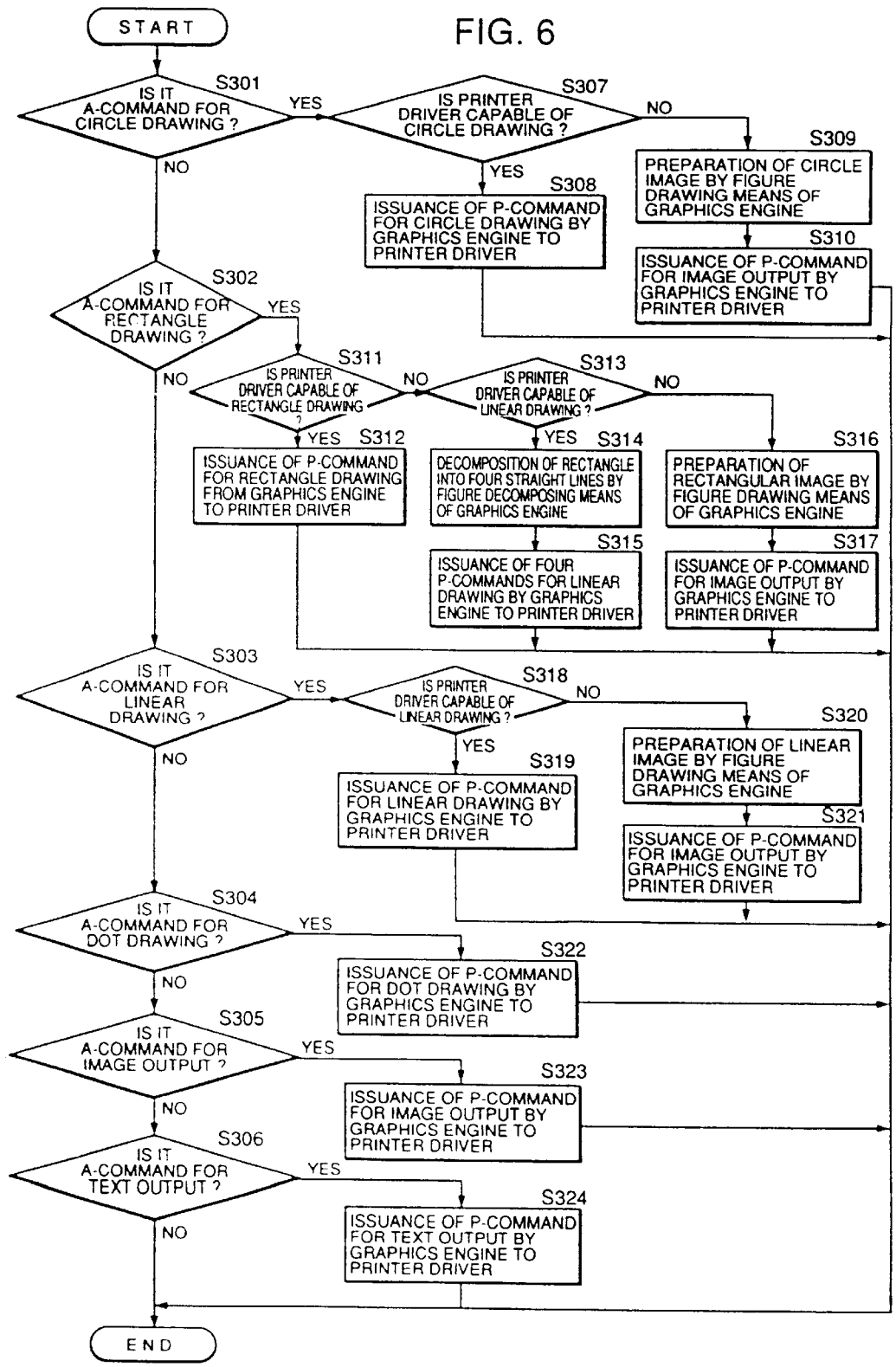
FIG. 6 is a flowchart showing graphics command processing operations.

[Explanation of the Flowcharts of FIGS. 4, 5 and 6]

FIGS. 4, 5 and 6 are flowcharts showing a series of printing procedures in the graphics system of the first embodiment, starting from the issuance of commands by the application and ending at the printing performed by the printer. In the drawings, symbols Si (i=1, 2, . . . ) indicate steps.

[FIG. 4]

Prior to printing, a desired printer is selected (S1, details of which will be given below with reference to FIG. 5).

The application issues an application command to output a character, figure or image to the printer (S2). The graphics engine analyzes the application command to convert it into an appropriate printer driver command and calls the printer driver (S3, details of which will be given below with reference to FIG. 6). The printer driver prepares, on the basis of the printer command, a command and data which are printable by the currently connected printer, and transmits them to the printer (S4). The printer performs printing in accordance with the command and data supplied from the printer driver (S5).

[FIG. 5 Printer Selection Procedures]

The printers which are currently available are listed up on a CRT or the like, and the operator selects a desired printer from them by using a pointing means such as a keyboard or a mouse (S11). When the desired printer has been selected, the graphics engine loads the printer driver for that printer into the memory, issues a figure-drawing-ability-inquiry command to the printer driver, and stores a figure-drawing-ability flag supplied from the printer driver in response to the inquiry command (S12).

[FIG. 6: Graphics Command Processing by the Graphics Engine]

The graphics processing control means 21 of the graphics engine 2 analyzes an application command from the application 1 by using the command analysis means 22.

If the application command is an A-command for circle drawing (S301), it is checked whether the printer driver has a circle drawing ability or not by referring to the figure drawing ability flag (S307). If the printer driver has the ability (S307: YES), the above application command is converted into a P-command for circle drawing and transferred to the printer driver (S308). If the printer driver does not have the ability (S307: NO), any circle has to be drawn as an aggregation of dots, so circle image data is prepared by the figure drawing means 25 (S309), and transferred to the printer driver by a P-command for image output (S310).

If the application command is not an A-command for circle drawing (S301: NO), a judgment is made as to whether the application command is an A-command for rectangle drawing or not (S302).

If the application command is an A-command for rectangle drawing (S302: YES), it is checked whether the printer driver has a rectangle figure drawing ability or not (S311). If the printer driver has the ability (S311: YES), the above application command is converted to a P-command for rectangle drawing and transferred to the printer driver (S312). If the printer driver does not have a rectangle figure drawing ability (S311: NO), it is checked whether the printer driver has a linear drawing ability or not by referring to the figure drawing ability flag again (S313). If the printer driver has the ability (S313: YES), the rectangle is decomposed into four straight lines by the figure decomposing means 24 (S314), converted into four P-commands for linear drawing, and then transferred to the printer driver (S315). If the printer driver does not have a linear drawing ability (S313: NO), any rectangle has to be drawn as an aggregation of dots, so rectangle image data is prepared by the figure drawing means 25 (S316) and transferred to the printer driver (S317) by a P-command for image output (S317).

If the application command is not an A-command for rectangle drawing (S302: NO), a judgment is made as to whether the application is an A-command for linear drawing (S303).

If the application command is an A-command for linear drawing (S303: YES), it is checked whether the printer driver has a linear drawing capability by referring to the figure drawing ability flag (S318). If the printer driver has the ability (S318: YES), the application command is converted to a P-command for linear drawing by the graphics engine and transferred to the printer driver (S319). If the printer driver does not have a linear drawing capability (S318: NO), the linear drawing has to be drawn as an aggregation of dots, so the linear image data is prepared by the figure drawing means 25 (S320) and transferred to the printer driver (S321) by a P-command for image output (S321).

If the application command is not an A-command for linear drawing (S303: NO) a judgement is made as to whether the application command is an A-command for dot drawing or not (S304).

If the application command is an A-command for dot drawing (S304: YES), the command is converted to a P-command for dot drawing and then transferred to the printer driver (S322)

If the application command is not an A-command for dot drawing (S304: NO), a judgment is made as to whether the application command is an A-command for image output or not (S305).

If the application command is an A-command for image output (S305: YES), the command is converted into a P-command for image output and then transferred to the printer driver (S323).

If the application command is not an A-command for image output (S305: NO), a judgment is made as to whether the application command is an A-command for text output or not (S306).

If the application command is an A-command for text output (S306: YES), the command is converted into a P-command for text output and then transferred to the printer driver (S324).

If the application command is not an A-command for text output (S306: NO), the command is to be regarded as invalid, and no step is performed.

(Second Embodiment)

The second embodiment does not differ from the first one except in regard to the way the figure drawing ability of the printer driver is detected by the graphics engine.

The printer driver commands do not include a P-command for an inquiry about figure drawing ability, so the figure drawing ability of the printer driver is not known to the graphics engine at first. The bits of the figure drawing ability flag are all set (that is, the printer driver is regarded to have all of the above-mentioned types of figure drawing ability). The printer driver receives a figure-drawing-ability command from the graphics engine and, when it cannot draw the figure in question, transmits an error code to the graphics engine indicating that it is incapable of drawing that figure. Upon receiving this error code from the printer driver, the graphics engine resets that bit of the figure drawing ability flag which corresponds to the ability to draw that flag. In the procedures from this step onward, the graphics engine issues commands in accordance with the figure drawing ability flag as updated in the flowchart of FIG. 6, so that it will not again request the printer driver to draw a figure the driver cannot draw.

(Third Embodiment)

The construction of a laser beam printer and an ink jet printer to which the third embodiment can be suitably applied will be described with reference to FIGS. 7 and 8. The printer to which this embodiment is applicable is not restricted to a laser beam printer or an ink jet printer. It is obviously also applicable to printers of other types.

Figure 7:
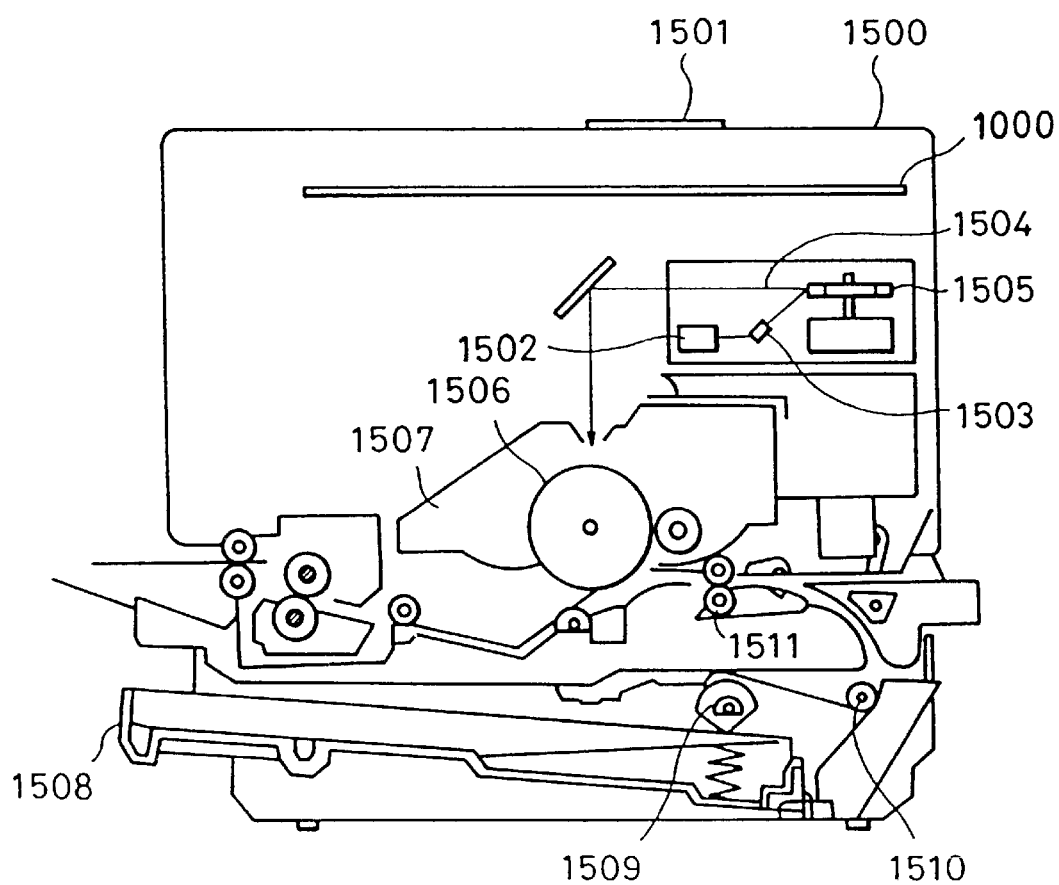
FIG. 7 illustrates a laser beam printer which can be suitably applied to an embodiment of the present invention.

FIG. 7 is a sectional view showing the construction of a first recording apparatus to which the present invention is applicable. This recording apparatus consists, for example, of an LBP (laser beam printer).

Referring to FIG. 7, numeral 1500 indicates the body of an LBP, which inputs and stores print information (character codes, etc.), form information, macro instructions, etc. supplied from a host computer which is externally connected thereto. Further, the LBP prepares corresponding character patterns, form patterns, etc. in accordance with such information from the host computer as mentioned above, and forms images on recording paper or the like, which serves as the recording medium. Numeral 1501 indicates an operation panel on which operating switches, LED displays, etc. are arranged. Numeral 1000 indicates a printer control unit for controlling the LBP body 1500 as a whole and for analyzing the character information, etc. supplied from the host computer. The printer control unit 1000 mainly converts character information into video signals of corresponding character patterns and supplies them to a laser driver 1502. The laser driver 1502 is a circuit for driving a semiconductor laser 1503 and is adapted to turn ON/OFF a laser beam 1504 emitted from the semiconductor laser 1503, in accordance with the video signals input thereto. The laser beam 1504 is swung by a revolving polygon mirror 1505 so as to scan/ expose an electrostatic drum 1506, thereby forming an electrostatic latent image of the character pattern on the electrostatic drum 1506. This latent image is developed by a developing unit 1507 provided in the periphery of the electrostatic drum 1506 and then transferred to transfer paper. The transfer paper consists of cut sheets, which are lodged in a paper cassette 1508 attached to the LBP 1500. By means of a paper feed roller 1509 and conveyance rollers 1510 and 1511, the cut sheets are taken into the apparatus and supplied to the electrostatic drum 1506.

Figure 8:
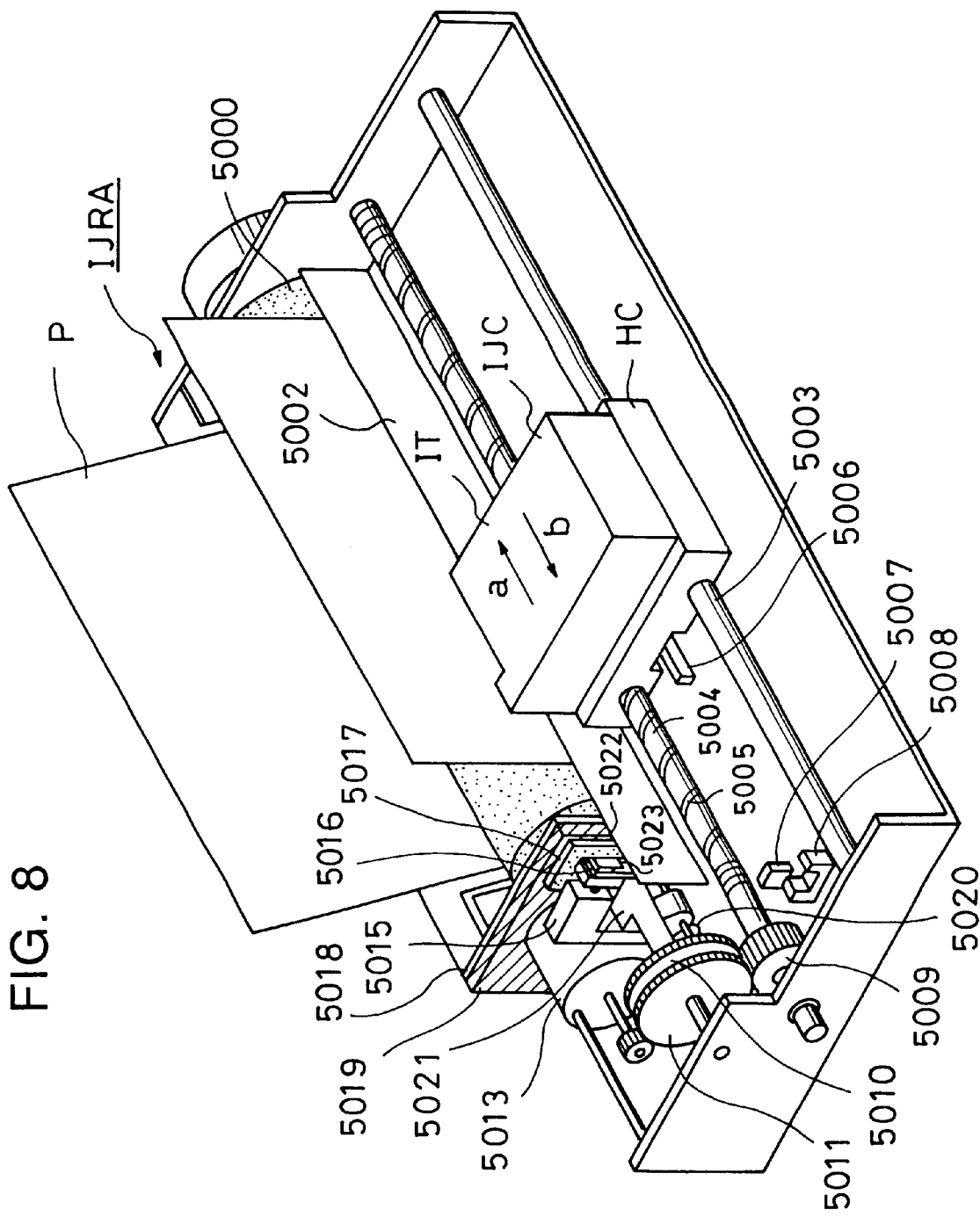
FIG. 8 illustrates an ink jet printer which can be suitably applied to the embodiment.

FIG. 8 is an exterior view showing the construction of a second recording apparatus to which the present invention is applicable. This recording apparatus consists, for example, of an IJRA (ink jet recording apparatus).

Referring to FIG. 8, normal/reverse rotation of a driving motor 5013 causes a lead screw 5004 to be rotated through driving-force transmission gears 5011 and 5009. The lead screw 5004 has a spiral groove 5005, which is engaged with a carriage HC having a pin (not shown) and adapted to reciprocate in the directions indicated by arrows a and b. An ink jet cartridge IJC is mounted on this carriage HC. Numeral 5002 indicates a paper presser, which presses the paper against a platen 5000 over a range of movement of the carriage HC. Numerals 5007 and 5008 indicate photocouplers, which are adapted to detect a lever 5006 of the carriage whenever it reaches an area around them, thus functioning as a home position detecting means for causing a change in the rotating direction of the motor 5013, etc. Numeral 5016 indicates a cap member for entirely covering a recording head, and numeral 5022 indicates a member for supporting the cap member 5016. Numeral 5015 indicates a suction means for sucking up any ink remaining in the cap member 5016 through an opening 5023 so as to restore the recording performance of the recording head to the normal state. Numeral 5017 indicates a cleaning blade, which can move along a member 5019. Numeral 5018 indicates a body supporting plate, which supports the cleaning blade 5017 and the member 5019. Numeral 5021 indicates a lever for starting the sucking action of the suction means to restore the performance of the recording head to the normal state. This lever moves with a cam 5020 which is engaged with the carriage. The transmission of driving force from the driving motor is controlled by a well-known transmission means based on clutch switching, etc.

The capping, cleaning and performance restoration by suction, mentioned above, can be effected when the carriage is brought to the home position area by the action of the lead screw 5005. The timing of these operations can be adjusted as desired by some well-known means.

As described above, in accordance with the present invention, the graphics engine takes into account the figure drawing ability of the printer driver as recognized by a printer-driver-figure-drawing-ability detecting means; when it is determined that the printer driver has no figure drawing ability, figure commands are converted into image data by the graphics engine and then transferred to the printer driver; and when it is determined that the printer driver has a figure drawing ability, the graphics engine decomposes figure commands into a figure which can be drawn by the printer driver and then transfers it to the printer driver, whereby it is possible to obtain printing results in the shortest time possible in accordance with the figure drawing ability of the printer driver.

As has been described in detail, it has been made possible to provide an output control method and output control apparatus in which in order that printing may be performed by using a printer driver corresponding to a desired printer selected, the figure drawing ability of this printer driver is recognized, and in which it can be determined, on the basis of the recognition result, whether to convert a figure as designated by a graphics command into image data or not.

What is claimed is:

1. An output control apparatus comprising:
    recognition means for recognizing a figure drawing ability of a printer driver which corresponds to a printer selected from among a plurality of printers, so as to perform printing by using the printer driver;
    conversion means for converting a figure drawing command into image data before sending the command to the printer driver;
    decomposition means for decomposing the figure drawing command into simpler figure drawing commands based on the figure drawing ability of the printer driver recognized by said recognition means; and
    control means for controlling one of (i) issuance of the figure drawing command to the printer driver, when the printer driver which corresponds to the selected printer is recognized as having a necessary figure drawing ability, (ii) conversion of the figure drawing command into image data by said conversion means and issuance of the image data to the printer driver, when the printer driver is recognized as not having the necessary figure drawing ability, and (iii) decomposition of the figure drawing command into simpler figure drawing commands by said decomposition means and issuance of the simpler figure drawing commands to the printer driver, when the printer driver is recognized as not having the necessary figure drawing ability, but having a simpler figure drawing ability.

2. An output control apparatus according to claim 1, said control means controlling conversion of a figure into image data by said conversion means when said recognition means recognizes that the printer driver has no figure drawing ability.

3. An output control method comprising the steps of:
    recognizing a figure drawing ability of a printer driver which corresponds to a printer selected from among a plurality of printers, so as to perform printing by using the printer driver; and
    controlling one of (i) issuance of a figure drawing command to the printer driver, when the printer driver which corresponds to the selected printer is recognized in said recognizing step has as having a necessary figure drawing ability, (ii) conversion of the figure drawing command into image data, and issuance of the image data to the printer driver, when the printer driver is recognized as not having the necessary figure drawing ability, and(iii) decomposition of the figure drawing command into simpler figure drawing commands and issuance of the simpler figure drawing commands to the printer driver, when the figure drawing ability of the printer driver is recognized as not having the necessary predetermined figure drawing ability, but as having a simpler figure drawing ability.

4. An output control method according to claim 3, said controlling step controlling conversion of a figure into image data in said converting step when said recognizing step recognizes that the printer driver has no figure drawing ability.

5. A computer program embodying a computer-implemented method of output control comprising the steps of:
    recognizing a figure drawing ability of a printer driver which corresponds to a printer selected from among a plurality of printers, so as to perform printing by using the printer driver;
    controlling one of (i) issuance of a figure drawing command to the printer driver, when the printer driver which corresponds to the selected printer is recognized in said recognizing step has as having a necessary figure drawing ability, (ii) conversion of the figure drawing command into image data, and issuance of the image data to the printer driver, when the printer driver is recognized as not having the necessary figure drawing ability, and (iii) decomposition of the figure drawing command into simpler figure drawing commands and issuance of the simpler figure drawing commands to the printer driver, when the figure drawing ability of the printer driver is recognized as not having the necessary predetermined figure drawing ability, but as having a simpler figure drawing ability; and recording onto a recording medium based on a result of said controlling step.

6. A computer program embodying a computer implemented method of output control according to claim 5, said controlling step controlling conversion of a figure into image data in said converting step when said recognizing step recognizes that the printer driver has no figure drawing ability.

7. An output control apparatus comprising:

at least one printer driver;

recognition means for recognizing a figure drawing ability of said at least one printer driver which corresponds to a printer selected from among a plurality of printers, so as to perform printing by using said at least one printer driver;

conversion means for converting a figure drawing command into image data;

decomposition means for decomposing the figure drawing command into simpler figure drawing commands based on the figure drawing ability of the printer driver recognized by said recognition means; and control means for controlling one of (i) issuance of the figure drawing command to said printer driver, when said printer driver which corresponds to the selected printer is recognized by said recognition means as having a necessary figure drawing ability, (ii) conversion by said conversion means of the figure drawing command into image data, by said conversion means, and issuance of the image data to said printer driver, when said printer driver is recognized as not having the necessary figure drawing ability, and (iii) decomposition by said decomposition means of the figure drawing command into simpler figure drawing commands, when said printer driver is recognized as not having the necessary predetermined figure drawing ability, but as having a simpler figure drawing ability.

8. An output control apparatus according to claim 7, said control means controlling conversion of a figure into image data by said conversion means when said recognition means recognizes that the printer driver has no figure drawing ability.

9. An output control apparatus comprising:

at least one printer driver;

at least one printer selected from among a plurality of printers;

recognition means for recognizing a figure drawing ability of said at least one printer driver which corresponds to said at least one printer selected from among a plurality of printers, so as to perform printing by using said at least one printer driver;

conversion means for converting a figure drawing command into image data;

decomposition means for decomposing the figure drawing command into simple figure drawing commands based on the figure drawing ability of the printer driver recognized by said recognition means; and control means for controlling one of (i) issuance of the figure drawing command to said printer driver, when said printer driver which corresponds to the selected printer is recognized by said recognition means as having a necessary figure drawing ability, (ii) conversion by said conversion means of the figure drawing command into image data, by said conversion means, and issuance of the image data to said printer driver, when said printer driver is recognized as not having the necessary figure drawing ability, and (iii) decomposition by said decomposition means of the figure drawing command into simpler figure drawing commands, when said printer driver is recognized as not having the necessary predetermined figure drawing ability, but as having a simpler figure drawing ability.

10. An output control apparatus according to claim 9, said control means controlling conversion of a figure into image data by said conversion means when said recognition means recognizes that the printer driver has no figure drawing ability.

11. A graphic engine for analyzing a command received from an application, convening the command into a figure drawing command, and issuing the figure drawing command to a printer driver, comprising:

first issuing means for issuing, when the printer driver which corresponds to a selected printer has a predetermined figure drawing ability, the predetermined figure drawing command to the printer driver;

second issuing means for issuing to the printer, when the printer driver does not have the predetermined figure drawing ability, but has a simpler figure drawing ability, simpler figure drawing commands decomposed from the figure drawing command;

creating means for creating, when the printer driver does not have the predetermined figure drawing ability, an image which corresponds to the predetermined figure drawing command; and third issuing means for issuing an image command corresponding to the image created by said creating means to the printer driver.

12. A graphic engine according to claim 11, wherein the predetermined figure drawing command comprises a circle drawing command.

13. A graphic engine according to claim 11, wherein the predetermined figure drawing command comprises a rectangle drawing command.

14. A graphic engine according to claim 11, wherein the predetermined figure drawing command comprises a line drawing command.

15. A graphic engine according to claim 11, further comprising obtaining means for obtaining, from the printer driver, information indicating whether or not a plurality of figure drawing processes can be performed.

16. A processing method for a graphic engine for analyzing a command received from an application, converting the command into a figure drawing command, and issuing the figure drawing command to a printer driver, said processing method comprising:

a first issuing step of issuing, when the printer driver which corresponds to a selected printer has a predetermined figure drawing ability, the predetermined figure drawing command to the printer driver;

a second issuing step of issuing to the printer, when the printer driver does not have the predetermined figure drawing ability, but has a simpler figure drawing ability, simpler figure drawing commands decomposed from the figure drawing command;

a creating step of creating, when the printer driver does not have the predetermined figure drawing ability, an image which corresponds to the predetermined figure drawing command; and a third issuing step of issuing an image command corresponding to the imaged created in said creating step to the printer driver.

17. A processing method according to claim 16, wherein the predetermined figure drawing command comprises a circle drawing command.

18. A processing method according to claim 16, wherein the predetermined figure drawing command comprises a rectangle drawing command.

19. A processing method according to claim 16, wherein the predetermined figure drawing command comprises a line drawing command.

20. A processing method according to claim 16, further comprising an obtaining step of obtaining, from the printer driver, information indicating whether or not a plurality of figure drawing processes can be processed.

21. A computer readable medium having stored therein computer readable program code for controlling a computer to perform a processing method for a graphic engine for analyzing a command received from an application, converting the command into a figure drawing command, and issuing the figure drawing command to a printer driver, the processing method comprising:

a first issuing step of issuing, when the printer driver which corresponds to a selected printer has a predetermined figure drawing ability, the predetermined figure drawing command to the printer driver;

a second issuing step of issuing to the printer, when the printer driver does not have the predetermined figure drawing ability, but has a simpler figure drawing ability, simpler figure drawing commands decomposed from the figure drawing command;

a creating step of creating, when the printer driver does not have the predetermined figure drawing ability, an image which corresponds to the predetermined figure drawing command; and a third issuing step of issuing an image command corresponding to the image created in said creating step to the printer driver.

22. A computer readable medium according to claim 21, wherein the predetermined figure drawing command comprises a circle drawing command.

23. A computer readable medium according to claim 21, wherein the predetermined figure drawing command comprises a rectangle drawing command.

24. A computer readable medium according to claim 21, wherein the predetermined figure drawing command comprises a line drawing command.

25. A computer readable medium according to claim 21, wherein the processing method controlled by the program code further comprises an obtaining step of obtaining, from the printer driver, information indicating whether or not a plurality of figure drawing processes can be processed.

26. A computer program for controlling a computer to perform a processing method for a graphic engine for analyzing a command received from an application, converting the command into a figure drawing command, and issuing the figure drawing command to a printer driver, the processing method comprising:

a first issuing step of issuing, when the printer driver which corresponds to a selected printer has a predetermined figure drawing ability, the predetermined figure drawing command to the printer driver;

a second issuing step of issuing to the printer, when the printer driver does not have the predetermined figure drawing ability, but has a simpler figure drawing ability, simpler figure drawing commands decomposed from the figure drawing command;

a creating step of creating, when the printer driver does not have the predetermined figure drawing ability, an image which corresponds to the predetermined figure drawing command; and a third issuing step of issuing an image command corresponding to the image created in said creating step to the printer driver.

27. A computer program according to claim 26, wherein the predetermined figure drawing command comprises a circle drawing command.

28. A computer program according to claim 26, wherein the predetermined figure drawing command comprises a rectangle drawing command.

29. A computer program according to claim 26, wherein the predetermined figure drawing command comprises a line drawing command.

30. A computer program according to claim 26, wherein the processing method further comprises an obtaining step of obtaining, from the printer driver, information indicating whether or not a plurality of figure drawing processes can be processed.

* * * * *